United States Patent [19]
Tremblay et al.

[11] Patent Number: 6,022,066
[45] Date of Patent: Feb. 8, 2000

[54] DOOR EXTENSION FOR VEHICLE DOORS

[75] Inventors: Jules Tremblay, Sunland; Dale Wayne Carpenter, Simi Valley, both of Calif.

[73] Assignee: Ricon Corporation, Panorama City, Calif.

[21] Appl. No.: 09/173,425

[22] Filed: Oct. 15, 1998

[51] Int. Cl.⁷ .................................................. B62D 25/04
[52] U.S. Cl. ........................................ 296/146.5; 49/502
[58] Field of Search .............................. 49/170, 171, 149, 49/502; 52/204.1; 296/146.1, 146.5, 151

[56] References Cited

U.S. PATENT DOCUMENTS

| | | | |
|---|---|---|---|
| 936,892 | 10/1909 | Heylmann | 296/151 |
| 4,861,097 | 8/1989 | Wycech . | |
| 4,978,562 | 12/1990 | Wycech . | |
| 5,083,833 | 1/1992 | Herrmeyer | 296/146.5 |
| 5,124,186 | 6/1992 | Wycech . | |
| 5,325,632 | 7/1994 | Djaviarian et al. . | |
| 5,766,774 | 7/1998 | Lynch et al. . | |
| 5,921,616 | 7/1999 | Hall et al. | 296/146.5 X |

*Primary Examiner*—Daniel P. Stodola
*Assistant Examiner*—Hugh B. Thompson
*Attorney, Agent, or Firm*—Thomas I. Rozsa; Tony D. Chen; Jerry Fong

[57] ABSTRACT

An upper door extension for vehicle doors, where the door extension conforms with a door frame recess of a raised roof. The door extension includes a support member and a contoured cover member. The support member includes a rigid frame and a pair of attachment rails which are attached to side edges of the rigid frame, such that a portion of each attachment rail extends downwardly therefrom. The contoured cover member is made of composite material and integrally molded to the support member and covers the entire rigid frame to form the upper door extension. The door extension is mounted to the vehicle door by inserting the attachment rails into a top end opening of the vehicle door and attaching the attachment rails to the interior sidewalls of the vehicle door.

18 Claims, 3 Drawing Sheets

DOOR EXTENSION FOR VEHICLE DOORS

BACKGROUND OF THE INVENTION

1. Field of the Invention

The present invention generally relates to the field of vehicles. More particularly, the present invention relates to the field of door extensions for vehicle doors.

2. Description of the Prior Art

Specifically, doors of vehicles such as a van or minivan are well known in the art. However, none of the prior art vehicle doors are designed and constructed as door extensions with composite materials for use in conjunction with vehicle doors.

U.S. Pat. No. 4,861,097 issued to Wycech on Aug. 29, 1989 discloses a lightweight composite automotive door beam and method of manufacturing same. The reinforcing beam includes an open channel-shaped metal member with a longitudinal cavity which is filled with a reinforcing polymeric material which in one aspect is a thermoset or thermoplastic resin-based material. The composite beam includes end pieces which are adapted to be mounted to a vehicle door panel in a door cavity. The horizontally mounted beam provided substantially increased resistance to side impacts to the vehicle door in the event of a collision. The beam is mounted between the window glass space and the inner door panel for flush-glass vehicle doors.

U.S. Pat. No. 4,978,562 issued to Wycech on Dec. 18, 1990 discloses a composite tubular door beam reinforced with a syntactic foam core localized at the mid-span of the tube. The reinforcing beam includes a metal tube with a longitudinal cavity which is partially filled with a reinforcing polymeric core which in one aspect includes a thermoset or thermoplastic resin-based material. The core is friction fit or mechanically held within the metal tube at the mid-span of the tube. The composite beam includes end pieces which are adapted to be mounted to a vehicle door panel in a door cavity. The horizontally mounted beam provides substantially increased resistance to side impacts to the vehicle door in the event of a collision.

U.S. Pat. No. 5,124,186 issued to Wycech on Jun. 23, 1992 discloses a composite tubular door beam reinforced with a reacted core localized at the mid-span of the tube. The reinforcing beam includes a metal tube with a longitudinal cavity which is partially filled with either a reinforcing polymeric core which in one aspect includes a thermoset or thermoplastic resin-based material or a cementitious core which includes Portland cement and a filler. The reacted core is friction fit or mechanically held within the metal tube at the mid-span of the tube. The composite beam includes end pieces which are adapted to be mounted to a vehicle door panel in a door cavity. The horizontally mounted beam provides substantially increased resistance to side impacts to the vehicle door in the event of a collision.

U.S. Pat. No. 5,325,632 issued to Djavairian et al. on Jul. 5, 1994 discloses a composite door assembly. It includes a tailored steel inner panel, a composite outer body panel, a belt-line reinforcement member which separates the inner and outer door panels along the bottom edge of the window opening and an intrusion beam. The tailored steel inner panel and the composite outer panel are adhered together. The reinforcement member is disposed between the inner and outer panels to enhance the shock absorbing characteristics of the vehicle door during collision.

U.S. Pat. No. 5,766,774 issued to Lynch et al. on Jun. 16, 1998 discloses a molded core component. It includes a center plane piece and at least one wall extending from the center plane piece. The wall includes contours which form a plurality of pods, cells or protrusions integral with the center plane piece.

It is highly desirable to have a very efficient and also very effective design and construction for a composite door extension for vehicle doors. It is also desirable to provide an upper door extension which conforms with a side door frame recess.

SUMMARY OF THE INVENTION

The present invention is an upper door extension for vehicle doors, where the door extension conforms with a door frame recess. The door extension includes a support member and a contoured cover member. The support member includes a rigid frame and a pair of attachment rails which are attached to side edges of the rigid frame, such that a portion of each attachment rail extends downwardly therefrom. The contoured cover member is made of composite material and integrally molded to the support member and covers the entire rigid frame to form the upper door extension. The door extension is mounted to the vehicle door by inserting the attachment rails into a top end opening of the vehicle door and attaching the attachment rails to the interior sidewalls of the vehicle door.

It is an object of the present invention to provide a composite door extension for a vehicle door, where the door extension is conformed with a side door frame recess.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
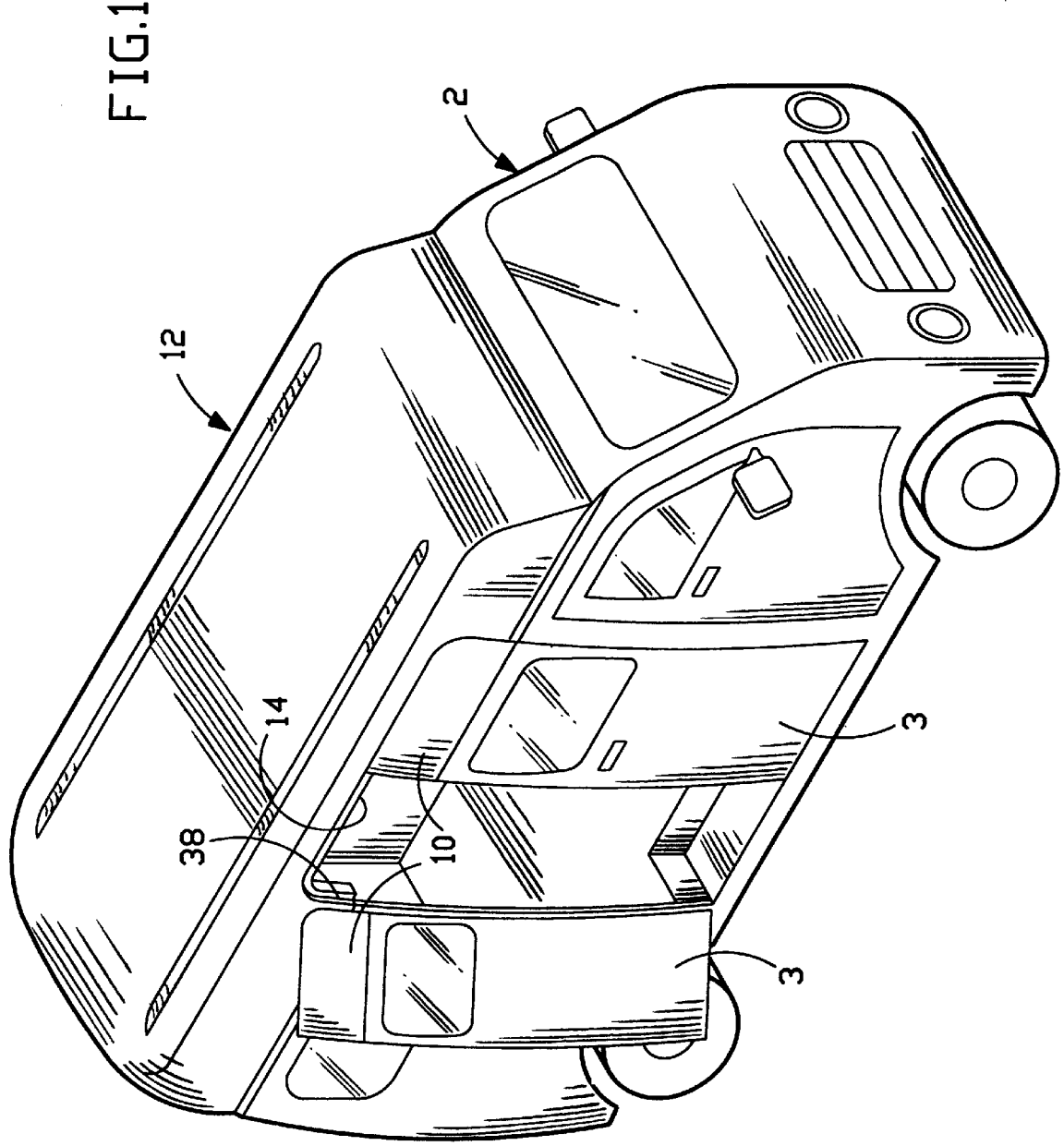
FIG. 1 is an isometric view of a vehicle with the present invention upper door extensions mounted on top of vehicle doors, showing one door is open and the other door is closed.

Referring to FIG. 1, there is shown at 10 the present invention upper door extension for use in conjunction with a vehicle 2 which includes doors 3 with top end openings 4 (see FIG. 5) and a raised roof 12 with a side door frame recess 14.

Figure 2:
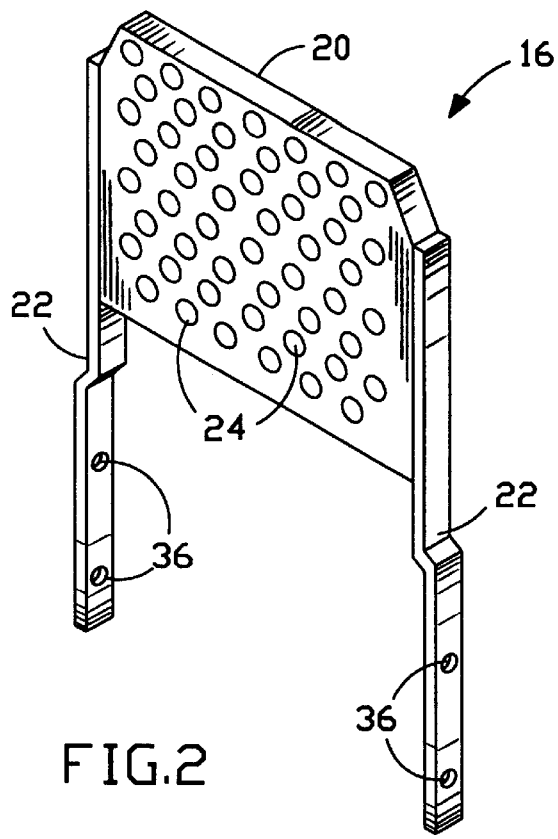
FIG. 2 is an isometric view of an inner support member of the present invention upper door extension.
Figure 3:
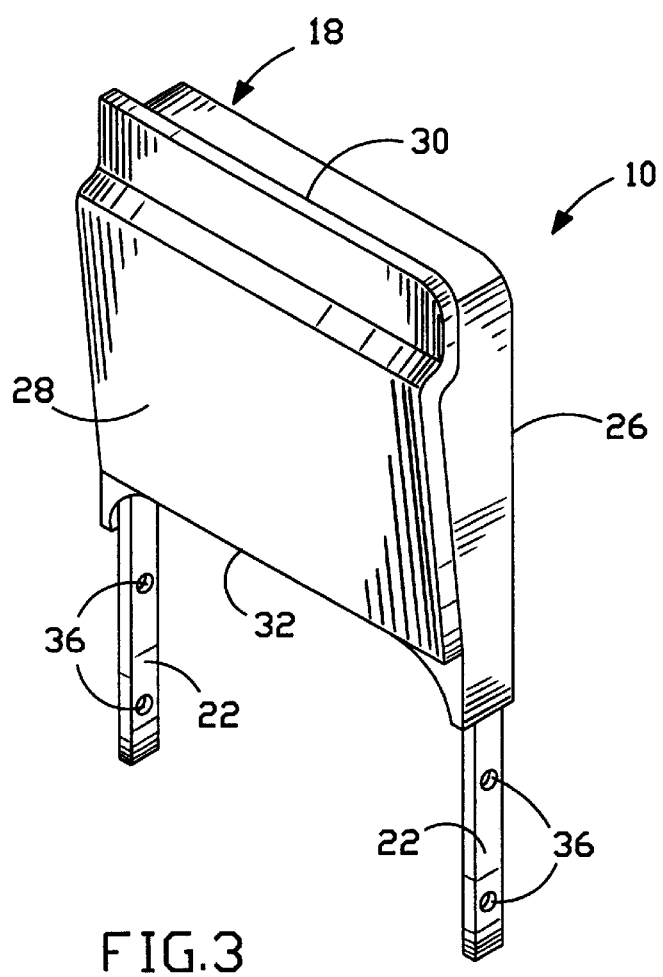
FIG. 3 is an isometric view of the present invention upper door extension.

Referring to FIGS. 2 and 3, the upper door extension 10 includes an inner support member 16 and a contoured cover member 18. The support member 16 includes a generally rectangular shaped rigid frame 20 and a pair of opposite attachment rails or legs 22 which are attached to and secured to side edges of the rigid frame 20 by conventional means such as spot-welding or any other suitable means. The rigid frame 20 is made from a sheet metal blank, wherein a plurality of individual apertures 24 are formed on the rigid frame 20 by cutting, stamping or the like. These plurality of apertures 24 reduce the weight of the door extension 10.

Figure 4:
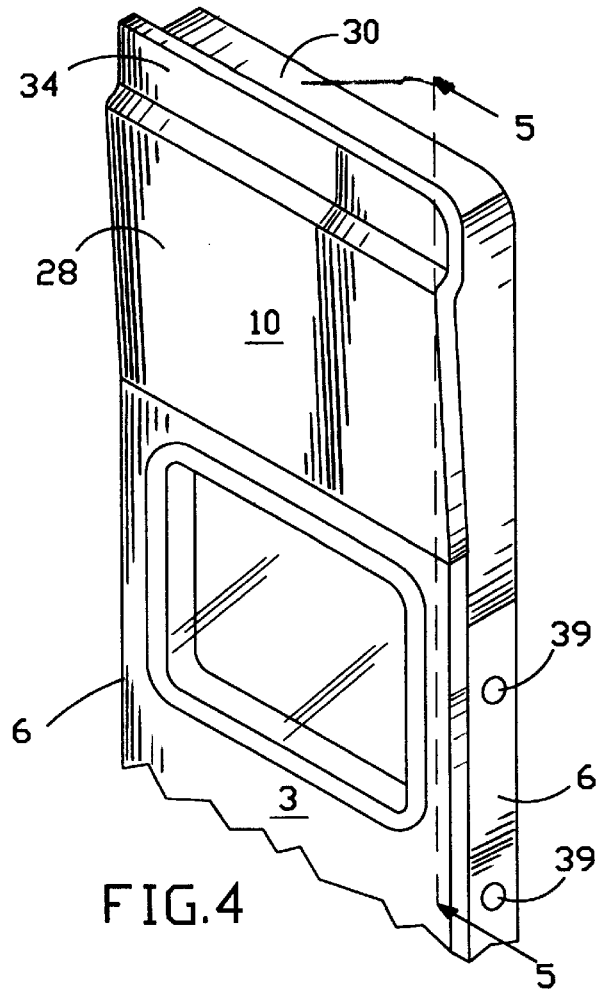
FIG. 4 is an isometric view of the present invention upper door extension mounted on top of a vehicle door.

Referring to FIGS. 3 and 4, the contoured cover member 18 is integrally molded to the inner support member 16 such that it covers the entire rigid frame 20, where the attachment rails 22 extend downwardly out from the cover member 18. The contoured cover member 18 includes a substantially flat interior side 26, a contoured exterior side 28, a top edge 30, and a bottom edge 32. A vertical flange 34 is formed with the top edge 30 and the exterior side 28.

Figure 5:
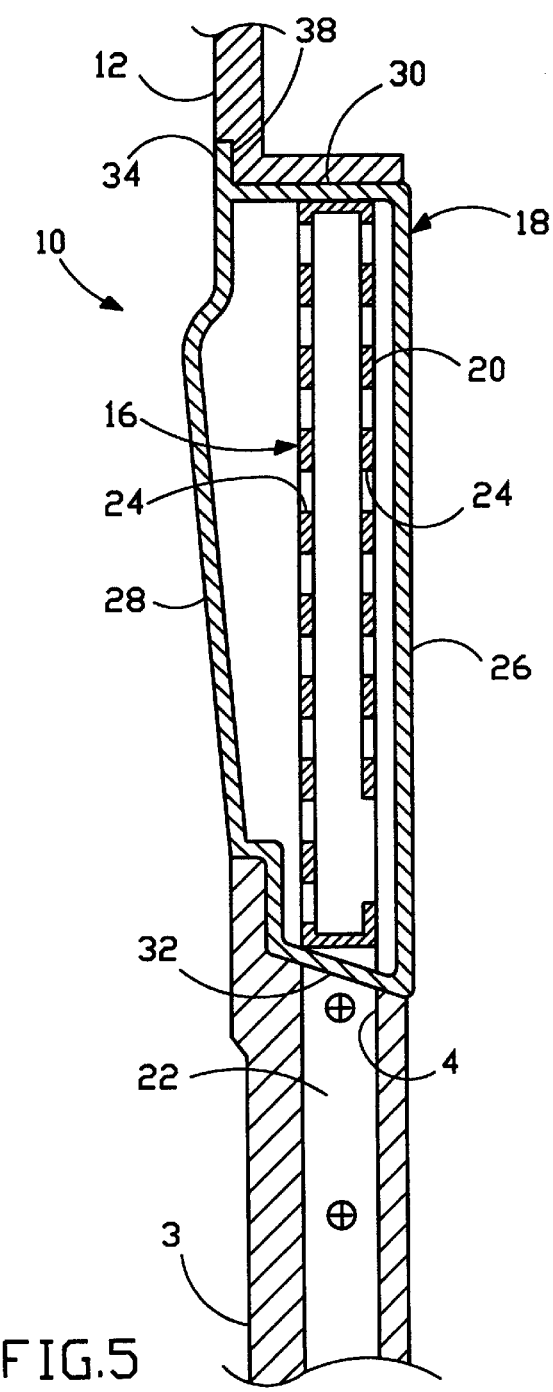
FIG. 5 is an enlarged cross-sectional view taken along line 5—5 of FIG. 4.

Referring to FIGS. 3, 4 and 5, the door extension 10 is mounted on top of the door 3 by inserting the two opposite attachment rails 22 into the top end opening 4 of the vehicle door 3, where the two pairs of bores 36 on the attachment rails 22 are respectively aligned with two pairs of bores 39 (only one pair of bores are shown) on the opposite sidewalls 6 of the vehicle door 3 and mounted thereto by conventional means such as bolts and nuts. The bottom edge 32 of the cover member 18 is conformed with the top end opening 4 of the vehicle door 3.

Referring to FIGS. 1, 4 and 5, the side door frame recess 14 of the raised roof 12 has a step-down section 38 which receives the vertical flange 34 of the upper door extension 10 such that the upper door extension 10 is flush with the raised roof 12.

The present invention conforms to conventional forms of manufacture or any other conventional way known to one skilled in the art. The manufacturing process which could accommodate the construction of the contoured cover member may be fiberglass molding, injection, thermoform, etc. or other molding process. By way of example, the contoured cover member can be made of composite material such as fiber glass material, acrylonitrile butadiene styrene (ABS) material, synthetic material or any other suitable materials known to one skilled in the art. The molding and mass production process will reduce the product cost for manufacturing the extended door portion.

Defined in detail, the present invention is an upper door extension for use in conjunction with a vehicle having a door with a top end opening and a raised roof with a door frame recess, the upper door extension comprising: (a) an inner support member having a rigid frame and a pair of opposite attachment legs attached to side edges of the rigid frame and extending downwardly therefrom for inserting into the top end opening of the vehicle door and attaching to opposite sidewalls of the vehicle door; and (b) a contoured cover member made of composite material integrally molded to the inner support member and covering the entire the rigid frame to form the upper door extension, the contoured cover member being sized to cover the upper opening of the door and conformed with the door frame recess.

Defined broadly, the present invention is a door extension for use in conjunction with a vehicle having a door, the door extension comprising: (a) a support member having means for attaching to the vehicle door; and (b) a cover member integrally formed with the support member to form the door extension.

Defined more broadly, the present invention is a door extension for use in conjunction with a vehicle having a door, the door extension comprising an integrated contoured member having means for attaching to the door and conforming to a door frame recess of the vehicle.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing fall public disclosure of at least one of its forms. However, such detailed description is not intended in any way to limit the broad features or principles of the present invention, or the scope of patent monopoly to be granted.

What is claimed is:

1. A door assembly in combination with a vehicle having an existing door with a top opening and a raised roof with a door frame recess, the door assembly comprising a door extension, the door extension having an integrated contoured member with at least one attachment rail extending downwardly from the contoured member and into the top opening of the vehicle door and attached to a sidewall of the vehicle door, where the contoured member is attached on top of the existing vehicle door and conforms to the door frame recess located at the raised roof of the vehicle.

2. The door extension in accordance with claim 1 wherein said integrated contoured member is made of composite material.

3. The door extension in accordance with claim 2 wherein said composite material includes acrylonitrile butadiene styrene (ABS) material.

4. The door extension in accordance with claim 2 wherein said composite material includes synthetic material.

5. The door extension in accordance with claim 2 wherein said composite material includes fiber glass material.

6. A door assembly in combination with a vehicle having an existing door with a top end opening and a raised roof with a door frame recess, the door assembly comprising:

a. a door extension having a support member with at least two vertical attachment rails extending downwardly into said top end opening of said vehicle door and respectively attached to opposite inner sidewalls of said vehicle door;

b. a cover member integrally formed with the entire said support member to form said door extension; and c. where said cover member is attached on top of said existing vehicle door and conforms to said door frame recess located at said raised roof of said vehicle.

7. The door extension in accordance with claim 6 wherein said support member includes a plurality of apertures.

8. The door extension in accordance with claim 7 wherein said support member is made of sheet metal.

9. The door extension in accordance with claim 6 wherein said cover member is made of composite material.

10. The door extension in accordance with claimed 9 wherein said composite material includes acrylonitrile butadiene styrene (ABS) material.

11. The door extension in accordance with claim 9 wherein said composite material includes synthetic material.

12. The door extension in accordance with claim 9 wherein said composite material includes fiber glass material.

13. A door assembly in combination with a vehicle having a door with a top end opening and a raised roof with a door frame recess, the door assembly comprising:

a. an upper door extension having an inner support member with a rigid frame and a pair of opposite vertical attachment legs attached to side edges of the rigid frame and extending downwardly into said top end opening of said vehicle door and attached to opposite sidewalls of said vehicle door;

b. a contoured cover member made of composite material integrally molded to said inner support member and covering the entire said rigid frame to form said upper door extension, the contoured cover member being sized to cover said top end opening of said door and conformed with said door frame recess located at said raised roof; and c. where said contoured cover member is attached on top of said existing vehicle door and conforms to said door frame recess located at said raised roof of said vehicle.

14. The upper door extension in accordance with claim 13 wherein said rigid frame includes a plurality of apertures.

15. The upper door extension in accordance with claim 13 wherein said rigid frame is made of sheet metal.

16. The upper door extension in accordance with claim 13 wherein said composite material includes acrylonitrile butadiene styrene (ABS) material.

17. The upper door extension in accordance with claim 13 wherein said composite material includes synthetic material.

18. The upper door extension in accordance with claim 13 wherein said composite material includes fiber glass material.

* * * * *